(12) United States Patent
Jang et al.

(10) Patent No.: US 8,863,913 B2
(45) Date of Patent: Oct. 21, 2014

(54) APPARATUS FOR TRANSFERRING OPTICAL ELEMENT INCLUDING BRAKE

(75) Inventors: Cheol-eun Jang, Suwon-si (KR); Chan-young Moon, Siheung-si (KR); Dong-eui Shin, Anyang-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 429 days.

(21) Appl. No.: 13/195,145

(22) Filed: Aug. 1, 2011

(65) Prior Publication Data

US 2012/0153110 A1 Jun. 21, 2012

(30) Foreign Application Priority Data

Dec. 15, 2010 (KR) .................. 10-2010-0128623

(51) Int. Cl.
| | | |
|---|---|---|
| *F16D 51/00* | (2006.01) | |
| *G02B 7/08* | (2006.01) | |
| *G03B 3/10* | (2006.01) | |
| *G02B 7/10* | (2006.01) | |

(52) U.S. Cl.
CPC .......... *G03B 3/10* (2013.01); *G03B 2205/0053* (2013.01); *G02B 7/102* (2013.01); *G02B 7/08* (2013.01)

USPC .................. 188/71.1; 188/74; 720/672

(58) Field of Classification Search
USPC ........ 188/74, 78, 71.1; 720/672, 683; 396/30; 348/368; 359/696, 698, 702
See application file for complete search history.

(56) References Cited

U.S. PATENT DOCUMENTS

| | | | |
|---|---|---|---|
| 5,699,199 A * | 12/1997 | Cho et al. ................. | 359/698 |
| 6,819,500 B2 | 11/2004 | Tsuzuki | |
| 6,856,469 B2 | 2/2005 | Yoneyama et al. | |
| 7,233,449 B2 | 6/2007 | Suemori et al. | |
| 8,488,053 B2 * | 7/2013 | Amano ................. | 348/368 |
| 2002/0071668 A1 * | 6/2002 | Kitagawa ............... | 396/30 |
| 2007/0039015 A1 * | 2/2007 | Lee et al. ............... | 720/683 |
| 2008/0010651 A1 * | 1/2008 | Wang et al. ............. | 720/672 |

* cited by examiner

*Primary Examiner* — Christopher Schwartz
(74) *Attorney, Agent, or Firm* — Drinker Biddle & Reath LLP (57) ABSTRACT

An apparatus for transferring an optical element, the apparatus including: a support portion for supporting the optical element; a guide portion for guiding the support portion to move in a rectilinear direction; a brake disposed between a first position that contacts the support portion and restricts a movement of the support portion, and a second position that is spaced apart from the support portion and allows the movement of the support portion to change a position thereof; and a driving portion for driving the brake.

7 Claims, 6 Drawing Sheets

APPARATUS FOR TRANSFERRING OPTICAL ELEMENT INCLUDING BRAKE

CROSS-REFERENCE TO RELATED PATENT APPLICATION

This application claims the priority benefit of Korean Patent Application No. 10-2010-0128623, filed on Dec. 15, 2010, in the Korean Intellectual Property Office, the entirety of which is incorporated herein by reference.

BACKGROUND

1. Field of the Invention

The invention relates to an apparatus for transferring an optical element, and more particularly, to an apparatus for transferring an optical element capable of stably maintaining a stop position of the optical element using a brake function realized when a brake contacts a support portion that supports the optical element.

2. Description of the Related Art

Digital photographing apparatuses, such as cameras or camcorders, include devices for moving a position of an optical element such as a lens in order to perform an auto-focusing (AF) function of adjusting a focus by automatically moving the optical element, or a zooming function.

A device for transferring the optical element must precisely adjust the position of the optical element, and, although the device is repeatedly used, must maintain positions of mechanical elements for supporting or moving the optical element.

SUMMARY

The invention provides an apparatus for transferring an optical element including a brake capable of stably maintaining a stop position of the optical element.

The invention also provides an apparatus for transferring an optical element capable of minimizing power consumed to maintain a stop position of the optical element.

The invention also provides an apparatus for transferring an optical element capable of precisely controlling a position of the optical element by minimizing a mechanical degradation of an element due to friction although the apparatus is repeatedly used.

According to an aspect of the invention, there is provided an apparatus for transferring an optical element, including: a support portion for supporting the optical element; a guide portion for guiding the support portion to move in a rectilinear direction; a brake disposed between a first position that contacts the support portion and restricts a movement of the support portion, and a second position that is spaced apart from the support portion and allows the movement of the support portion to change a position thereof; and a driving portion for driving the brake.

The brake may be disposed outside the support portion, the first position may be a position where the brake contacts at least a part of an outside boundary of the support portion, the second position may be a position where the brake is outwardly spaced apart from the support portion, and the brake rectilinearly may move between the first position and the second position.

The brake may be disposed outside the support portion, the first position may be a position where the brake contacts at least a part of the outside boundary of the support portion, the second position may be a position where the brake is outwardly spaced apart from the support portion, and the brake may be rotatably disposed to perform rotation between the first position and the second position.

The brake may include a rotation plate disposed rotatably with respect to the support portion, and a movement shaft connected to the rotation plate and extending approximately parallel to a direction in which the guide portion extends.

The apparatus may further include an elastic portion connected to the brake and applying pressure to the brake toward any one of the first position and the second position.

The brake may include a rotation shaft extending approximately parallel to the direction in which the guide portion extends and disposed to rotate responsive to the driving portion, and a contact pad portion disposed outside the rotation shaft, wherein the support portion comprises a path portion through which the rotation shaft and the contact pad portion pass, and wherein the first position is a position where the rotation shaft rotates in one direction such that the contact pad portion contacts the path portion, and the second position is a position where the rotation shaft rotates in another direction such that the contact pad portion is spaced apart from the path portion.

The apparatus may further include: a friction pad portion disposed on a surface of the path portion facing the contact pad portion.

The contact pad portion may have a polygonal or oval cross-section such that the contact pad portion has at least one corner portion contacting the path portion as the rotation shaft rotates.

The path portion may have a polygonal or oval cross-section such that the path portion surrounds the contact pad portion.

The apparatus may further include an elastic portion connected to the rotation shaft and rotating the rotation shaft toward any one of the first position and the second position.

BRIEF DESCRIPTION OF THE DRAWINGS

The above and other features and advantages of the invention will become more apparent by describing in detail exemplary embodiments thereof with reference to the attached drawings in which.

DETAILED DESCRIPTION

The invention will now be described more fully with reference to the accompanying drawings, in which exemplary embodiments of the invention are shown.

Figure 1:
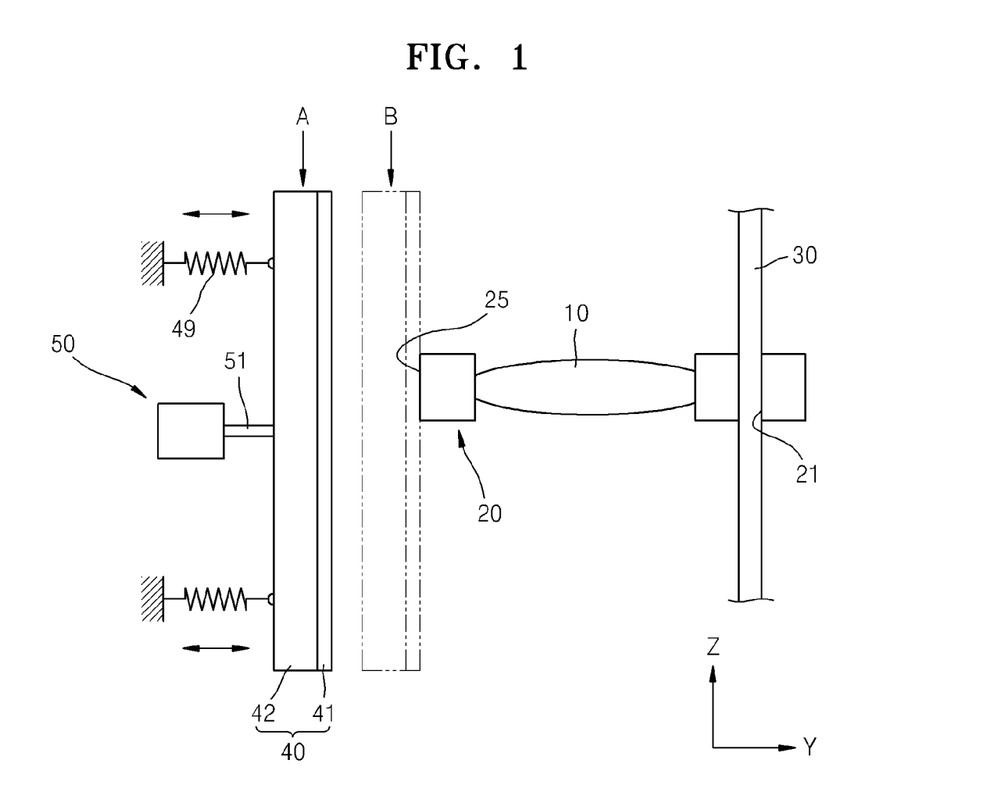
FIG. 1 is a schematic side view of an apparatus for transferring an optical element, according to an embodiment of the invention.

FIG. 1 is a schematic side view of an apparatus for transferring an optical element 10, according to an embodiment of the invention.

Referring to FIG. 1, the apparatus for transferring the optical element 10 includes a support portion 20 that supports the optical element 10, a guide portion 30 that guides the support portion 20 to move in a rectilinear direction, a brake 40 that allows or restricts a movement of the support portion 20, and a driving portion 50 that drives the brake 40.

The optical element 10 that is an element for transmitting light may be, for example, a focusing lens or a zooming lens. The apparatus for transferring the optical element 10 may supplement focusing or zooming by moving the optical element 10 in a Z axis direction.

The support portion 20 surrounds the boundary of the optical element 10 to support the optical element 10. The support portion 20 includes a sliding hole 21 into which the guide portion 30 is inserted, and is movably coupled to the guide portion 30. The guide portion 30 extends in a rectilinear direction (in the Z axis direction), and, thus, if the support portion 20 moves along the guide portion 30, a position of the optical element 10 in the Z axis direction may change.

A driving device for moving the support portion 20 is not shown in FIG. 1. A variety of devices may be used to drive the support portion 20. For example, a voice coil motor (VCM) including a driving coil and a driving magnet, a piezoelectric actuator for generating a driving force due to vibration generated by a piezoelectric device, or a step motor and a gear assembly may be used as the driving device for moving the support portion 20.

The brake 40 is selectively disposed between a first position A that contacts the support portion 20 and restricts a movement of the support portion 20, and a second position B that is spaced apart from the support portion 20 and allows the movement of the support portion 20 to change a position thereof.

The brake 40 includes a movement portion 42 that is coupled to a driving shaft 51 of the driving portion 50 and rectilinearly moves in a Y axis direction, and a contact pad portion 41 that is coupled to the surface of the movement portion 42.

Although the driving portion 50 is an actuator including the driving shaft 51 that extends in the Y axis direction in FIG. 1, the invention is not limited thereto. For example, the driving portion 50 may be realized as a piezoelectric actuator, or a step motor and a gear assembly.

In the present embodiment, the brake 40 may be disposed outside the support portion 20 and rectilinearly move in the Y axis direction. The brake 40 contacts at least a part of an outside boundary 25 of the support portion 20 in the first position A, and, thus, friction between the support portion 20 and the contact pad portion 41 restricts the movement of the support portion 20. The brake 40 is outwardly spaced apart from the support portion 20 in the second position B, and, thus, the support portion 20 may freely move along the guide portion 30.

An elastic portion 49 that applies pressure to the brake 40 toward the first position A may be coupled to the brake 40. The driving portion 50 generates a driving force stronger than an elastic force of the elastic portion 49 in order to move the brake 40 to the second position B. Thus, when the driving portion 50 does not operate, the elastic force of the elastic portion 49 enables the brake 40 to remain in the first position A, and, thus, the support portion 20 can maintain its fixed position.

Although the elastic portion 49 applies pressure to the brake 40 toward the first position A in FIG. 1, the invention is not limited thereto. The elastic portion 49 may be installed to apply pressure to the brake 40 toward the second position B.

The apparatus for transferring the optical element 10 of the present embodiment realizes a brake function by contacting the brake 40 to the support portion 20, which minimizes or reduces damage on the guide portion 30, thereby maintaining precision of the guide portion 30. Friction between the brake 40 and the support portion 20 may be used to stably maintain a stop position of the optical element 10.

Further, the elastic portion 49 enables the brake 40 to remain in the first position A although an electrical driving force is not separately supplied, thereby reducing power consumed to maintain the position of the optical element 10 to a specific position.

Figure 2:
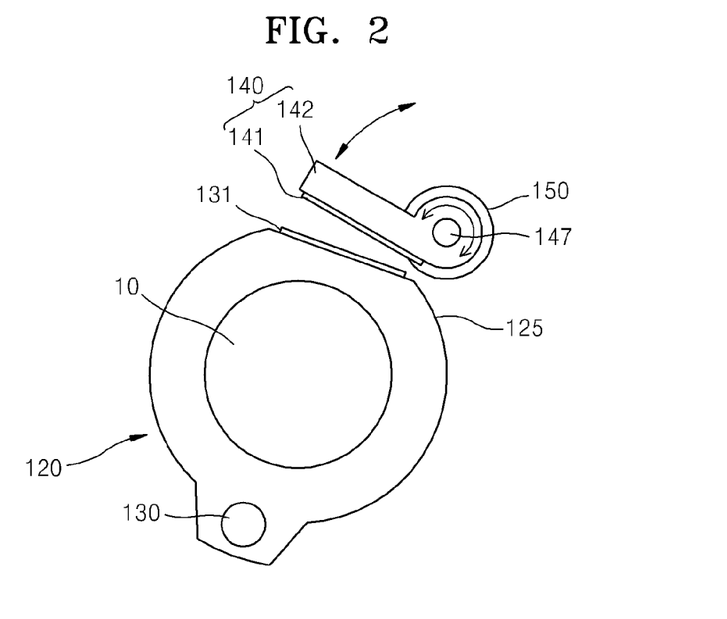
FIG. 2 is a schematic plane cross-sectional view of an apparatus for transferring an optical element, according to another embodiment of the invention.

FIG. 2 is a schematic plane cross-sectional view of an apparatus for transferring the optical element 10, according to another embodiment of the invention.

Referring to FIG. 2, the apparatus for transferring the optical element 10 includes a support portion 120 that supports the optical element 10, a guide portion 130 that guides the support portion 120 to move in a rectilinear direction, a brake 140 that allows or restricts a movement of the support portion 120, and a driving portion 150 that drives the brake 140.

The brake 140 is disposed outside the support portion 120 to rotate with respect to the support portion 120. The brake 140 includes a rotation plate 142 that is rotatably disposed with respect to the support portion 120, and a contact pad portion 141 that is coupled to the surface of the rotation plate 142.

A friction pad portion 131 is disposed on an outside boundary 125 of the support portion 120 corresponding to the brake 140. The friction pad portion 131 frictionally selectively contacts the contact pad portion 141 of the brake 140 and, thus, a brake function may be realized.

The brake 140 may rotate between a first position that contacts at least a part of the friction pad 131 of the support portion 120, and a second position that is spaced apart from the support portion 120. When the brake 140 is in the first position, friction between the brake 140 and the friction pad 131 enables the support portion 120 to maintain its fixed position with respect to the guide portion 130. When the brake 140 is in the second position, the support portion 120 may freely move with respect to the guide portion 130.

Although not shown, an elastic portion that applies pressure to the rotation plate 142 in one direction may be disposed. The elastic portion may be, for example, a compression coil spring that is coupled to a rotation shaft 147 and supplies a rotational force to rotate the rotation plate 142 toward the support portion 120.

Figure 3:
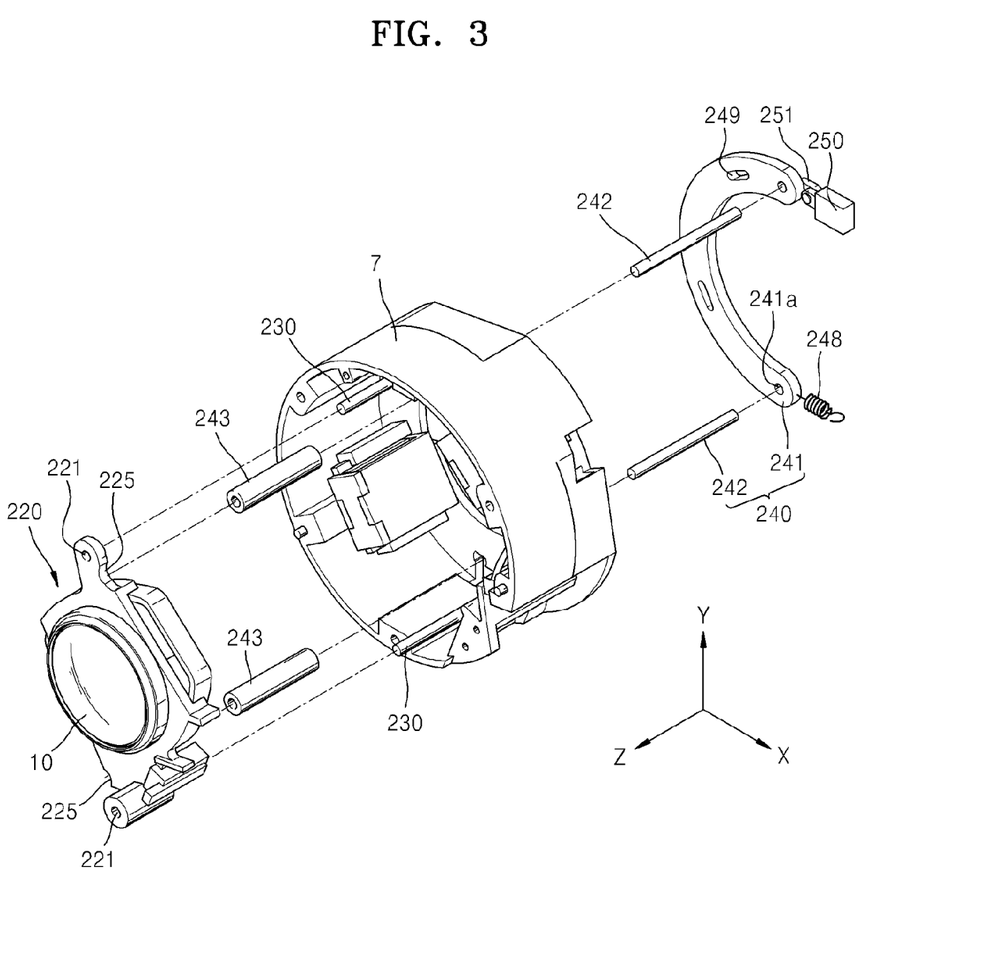
FIG. 3 is an exploded perspective view illustrating elements of an apparatus for transferring an optical element, according to another embodiment of the invention.
Figure 4:
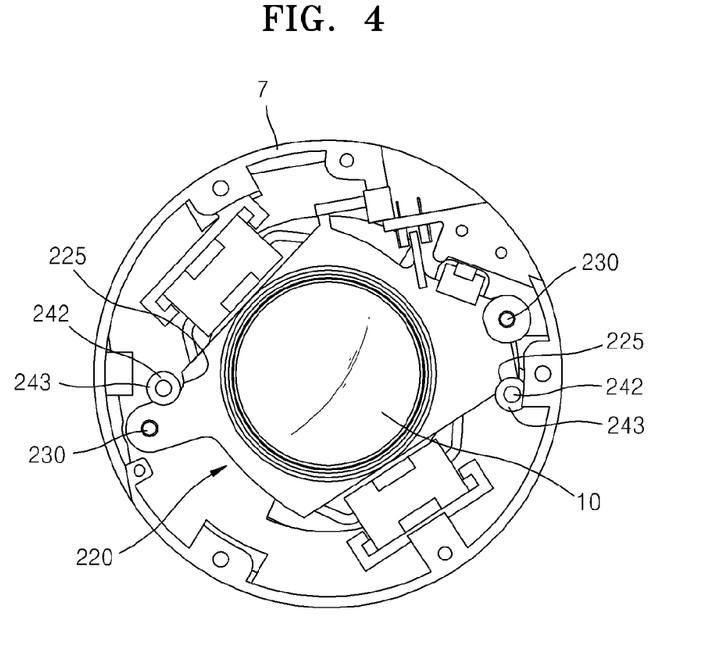
FIG. 4 is a top view of the apparatus for transferring the optical element of FIG. 3.
Figure 5:
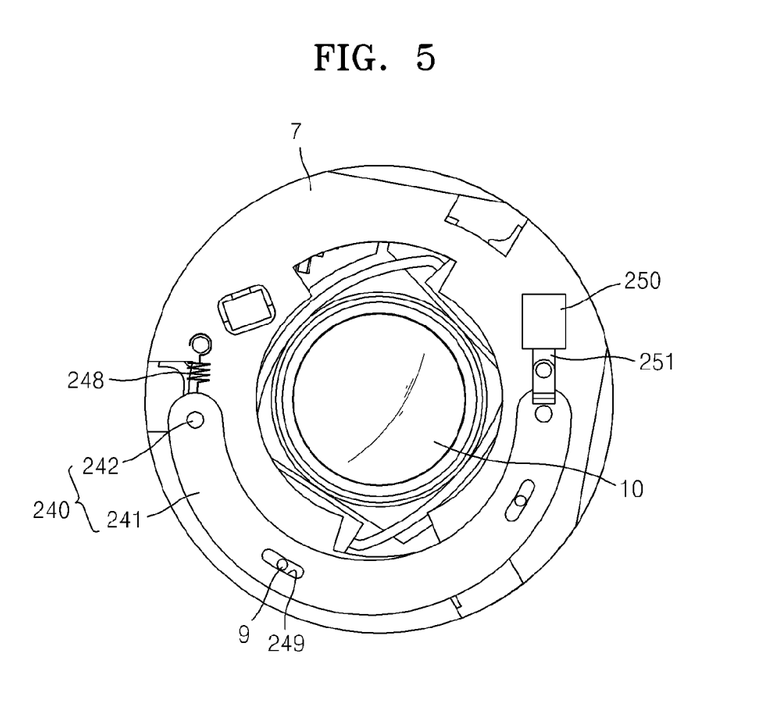
FIG. 5 is a bottom view of the apparatus for transferring the optical element of FIG. 3.

FIG. 3 is an exploded perspective view illustrating elements of an apparatus for transferring the optical element 10, according to another embodiment of the invention. FIG. 4 is a top view of the apparatus of FIG. 3 for transferring the optical element 10. FIG. 5 is a bottom view of the apparatus of FIG. 3 for transferring the optical element 10.

Referring to FIGS. 3 through 5, the apparatus for transferring the optical element 10 includes a support portion 220 that supports the optical element 10, guide portions 230 that guide the support portion 220 to move in a rectilinear direction, a brake 240 that allows or restricts a movement of the support portion 220, and a driving portion 250 that drives the brake 240.

The guide portions 230 extend in a Z axis direction and are disposed in a case 7 in an approximately cylindrical shape. The support portion 220 includes sliding holes 221 into which the guide portions 230 are inserted, and are movably coupled to the guide portions 230 through the sliding holes 221.

The brake 240 includes a rotation plate 241 that is disposed in the case 7 to rotate with respect to the support portion 220, and movement shafts 242 that are connected to the rotation plate 241 to extend approximately parallel to a direction in which the guide portions 230 extend. End portions of the movement shafts 242 are coupled to coupling holes 241a of the rotation plate 241 so that the movement shafts 242 and the rotation plate 241 can rotate together.

Referring to FIG. 5, the rotation plate 241 includes a guide hole 249 that extends in a long shape and is slidingly coupled to a guide pin 9 included in the case 7.

A driving shaft 251 of the driving portion 250 is extendably connected to one end of the rotation plate 241 so that the rotation plate 241 can rotate clockwise or counterclockwise. An elastic portion 248 is connected to another end of the rotation plate 241. The elastic portion 248 supplies an elastic force to rotate the rotation plate 241 in one direction.

Contact pad portions 243 are disposed outside the movement shafts 242. Friction pad portions 225 are formed on an outside boundary of the support portions 220 to contact the contact pad portions 243.

The movement shafts 242 move toward the support portion 220 as shown in FIG. 4, the contact pad portions 243 and the friction pad portions 225 contact in a first position of the brake 240. When the brake 240 is in the first position, friction between the contact pad portions 243 and the friction pad portions 225 enables the support portion 220 to maintain its stable position with respect to the guide portion 230.

Referring to FIG. 4, if the driving portion 250 rotates the rotation plate 241, the movement shafts 242 outwardly move from the support portion 220 so that the friction pad portions 225 and the contact pad portions 243 are spaced apart from each other in a second position of the brake 240. When the brake 240 is in the second position, the support portion 220 may freely move with respect to the guide portion 230.

If the driving force of the driving portion 250 is released in the second position, the elastic portion 249 enables the support portion 220 to move to the first position.

Figure 6:
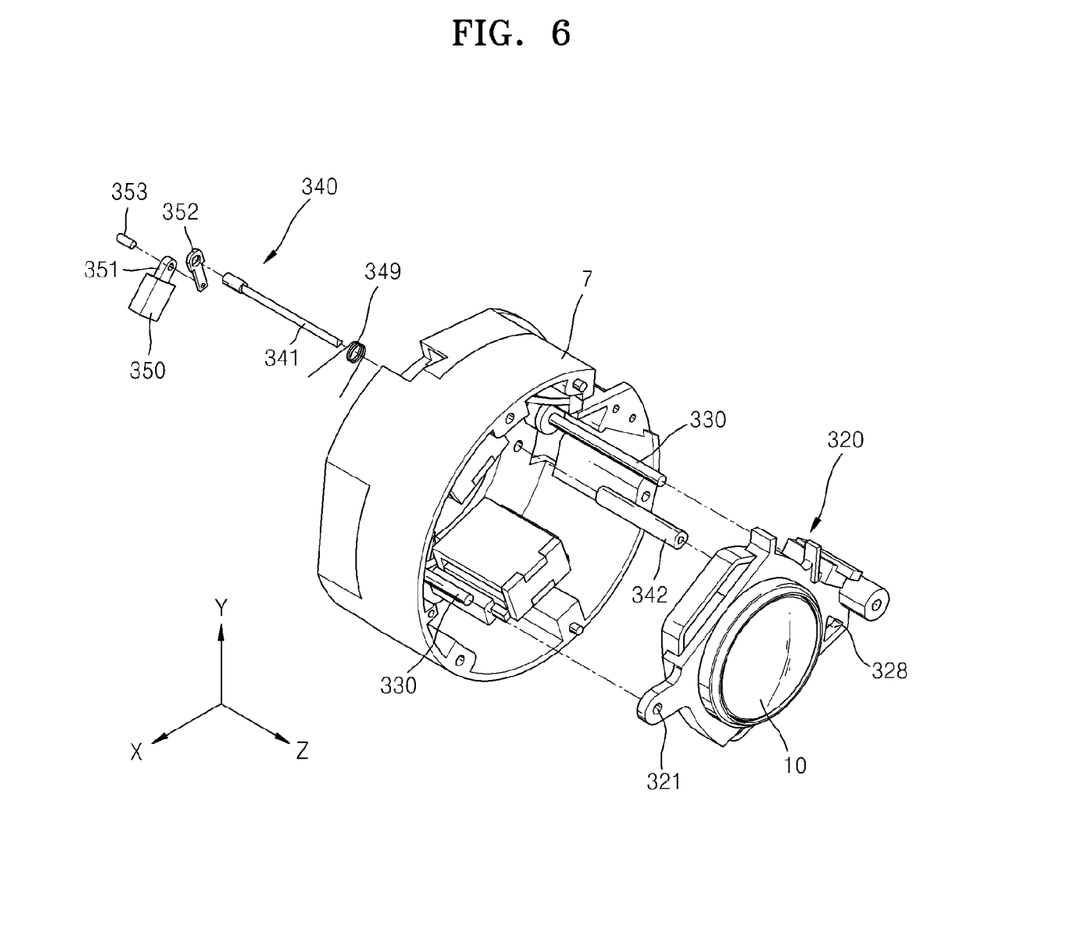
FIG. 6 is an exploded perspective view illustrating elements of an apparatus for transferring an optical element, according to another embodiment of the invention.
Figure 7:
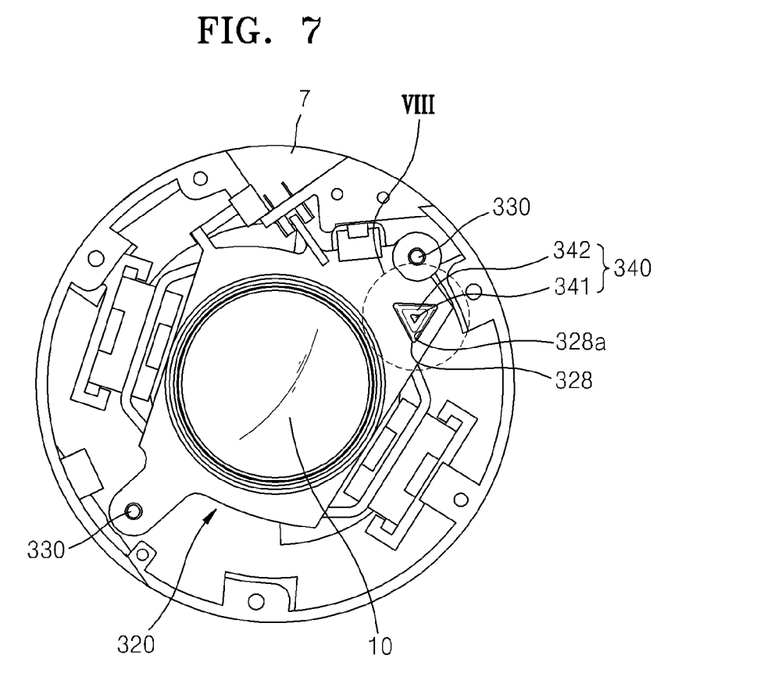
FIG. 7 is a top view of the apparatus for transferring the optical element of FIG. 6.
Figure 8:
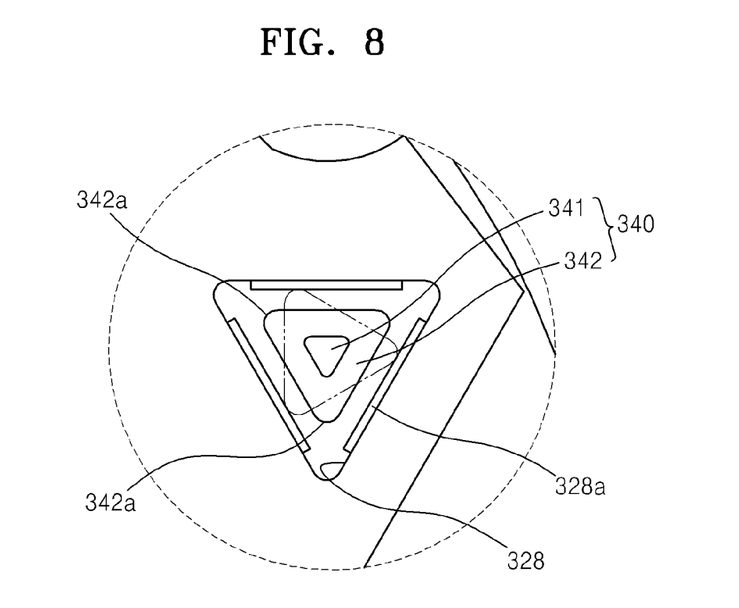
FIG. 8 is a magnification view of some elements of a portion VIII of the apparatus for transferring the optical element of FIG. 7.

FIG. 6 is an exploded perspective view illustrating elements of an apparatus for transferring the optical element 10, according to another embodiment of the invention. FIG. 7 is a top view of the apparatus of FIG. 6 for transferring the optical element 10. FIG. 8 is a magnification view of some elements of a portion VIII of the apparatus of FIG. 6 for transferring the optical element 10.

Referring to FIGS. 6 through 8, the apparatus for transferring the optical element 10 includes a support portion 320 that supports the optical element 10, guide portions 330 that guide the support portion 320 to move in a rectilinear direction, a brake 340 that allows or restricts a movement of the support portion 320, and a driving portion 350 that drives the brake 340.

The guide portions 330 extend in a Z axis direction and are disposed in the case 7 in an approximately cylindrical shape. The support portion 320 includes sliding holes 321 into which the guide portions 330 are inserted, and is movably coupled to the guide portions 330 through the sliding holes 321.

The brake 340 includes a rotation shaft 341 that extends approximately parallel to a direction in which the guide portions 330 extend and rotates in response to the driving portion 350, and a contact pad portion 342 that is disposed outside the rotation shaft 341.

An end portion of the rotation shaft 341 is coupled to a driving shaft 351 of the driving portion 350 using a link 352 interposed between the rotation shaft 341 and the driving shaft 351. An end portion of the link 352 is rotatably coupled to the driving shaft 351 using a pin 353. An operation of the driving portion 350 can lead to rotation of the rotation shaft 341.

Although the driving portion 350 is an actuator including the driving shaft 351 that extends in the present embodiment, the invention is not limited thereto. The driving portion 350 may be realized as a piezoelectric actuator including a piezoelectric device, or a step motor and a gear assembly.

The support portion 320 includes a path portion 328 through which the rotation shaft 341 and the contact pad portion 342 pass.

A cross-sectional shape of the path portion 328 is triangular by which the contact pad portion 342 is surrounded. Friction pad portions 328a are installed on inside surfaces of the path portion 328 toward the contact pad portion 342. The friction pad portions 328a reinforce a frictional contact force with the contact pad portion 342, which increases brake performance.

An elastic portion 349 is coupled to outside the rotation shaft 341 to supply an elastic force so as to apply pressure to the rotation shaft 341 in one direction.

Outside corner portions 342a of the contact pad portion 342 indicated in a solid line of FIG. 8 are spaced apart from the path portion 328 and the friction pad portion 328a in a second position of the brake 340. When the brake 340 is in the second position, the support portion 320 may freely move with respect to the guide portion 330.

The outside corner portions 342a of the contact pad portion 342 indicated in a dotted line of FIG. 8 contact the friction pad portions 328a in a first position of the brake 340. When the brake 340 is in the first position, the contact pad portion 342 and the friction pad portions 328a frictionally contact each other, which restricts a movement of the support portion 320 with respect to the guide portion 330.

Although the cross-sectional shape of the path portion 328 is triangular in the present embodiment, the cross-sectional shape of the path portion 328 may be polygonal, such as rectangular or pentagonal, or oval. Further, a cross-section shape of the contact pad portion 342 may be triangular and polygonal, such as rectangular or pentagonal, or oval as well.

Figure 9:
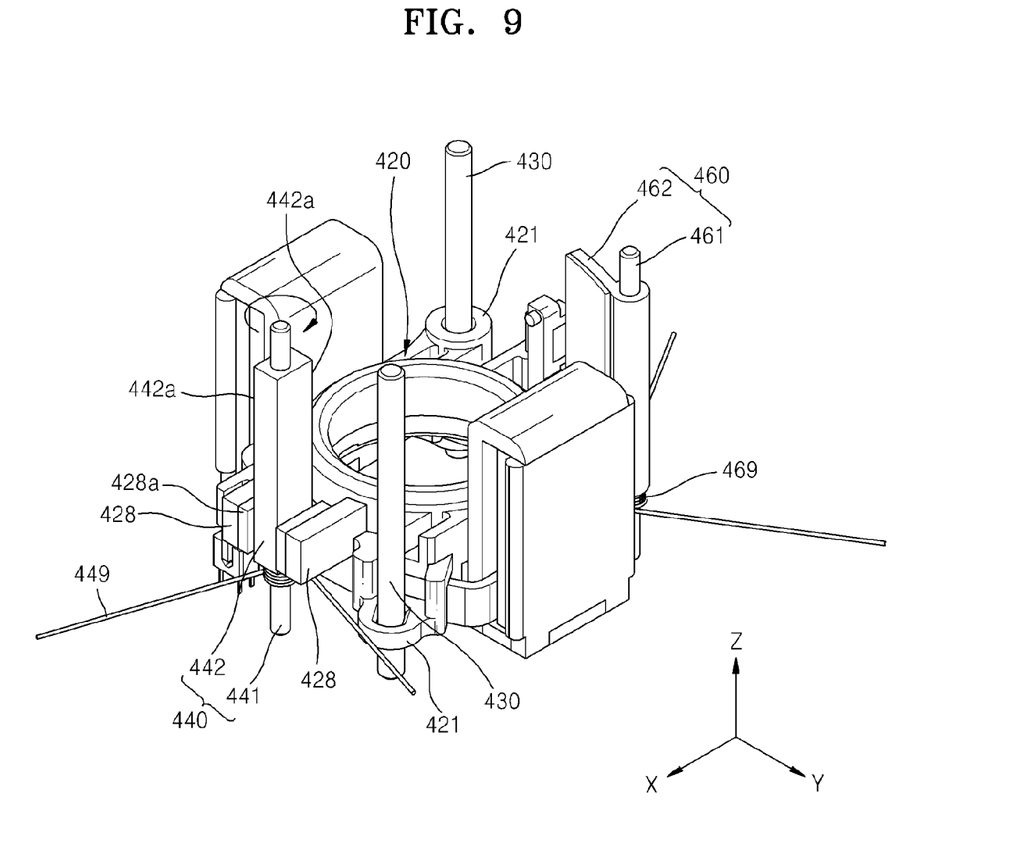
FIG. 9 is a perspective view of an apparatus for transferring an optical element, according to another embodiment of the invention.

FIG. 9 is a perspective view of an apparatus for transferring an optical element, according to another embodiment of the invention.

Referring to FIG. 9, the apparatus for transferring the optical element includes a support portion 420 that supports the optical element, guide portions 430 that guide the support portion 420 to move in a rectilinear direction, a brake 440 that allows or restricts a movement of the support portion 420, and a driving portion (not shown) that drives the brake 440.

The driving portion 350 described with reference to FIGS. 6 through 8 may be used in the present embodiment, and, thus, the driving portion that drives the brake 440 is not shown in FIG. 9.

The support portion 420 may be slidably supported by the guide portions 430 and rectilinearly move in a Z axis direction. Sliding support portions 421 into which the guide portions 430 are inserted are disposed on the support portion 420.

A path portion 428 that accommodates the brake 440 is formed on the support portion 420. A part of an outside boundary of the path portion 428 externally opens so that the brake 440 is rotatably accommodated inside the path portion 428.

The brake 440 includes a rotation shaft 441 and a contact pad portion 442 that is coupled to outside the rotation shaft 441. An elastic portion 449 is disposed outside the rotation shaft 441 and supplies an elastic force to the rotation shaft 441 in one direction.

Friction pad portions 428a are disposed on inside surfaces of the path portion 428 toward the brake 440. The friction pad portions 428a and the contact pad portion 442 frictionally and selectively contact each other, and, thus, a brake function of fixing a position of the support portion 420 with respect to the guide portion 430 may be realized.

A cross-sectional shape of the contact pad portion 442 is approximately rectangular. The contact pad portion 442 and the friction pad portion 428a are spaced apart from each other in a second position of the brake 440. When the brake 440 is in the second position, the support portion 420 may freely move with respect to the guide portion 430.

If the rotation shaft 441 rotates, corner portions 442a of the contact pad portion 442 contact the friction pad portions 428a in a first position of the brake 440. When the brake 440 is in the first position, the support portion 420 maintains its fixed position with respect to the guide portion 430.

A second brake 460 including a second rotation shaft 461 and a rotation plate 462 coupled to the second rotation shaft 461 may be disposed outside the support portion 420. The second brake 460 supplements the brake function that restricts a movement of the support portion 420 in cooperation with the brake 440. An elastic portion 469 that supplies an elastic force to rotate the rotation shaft 461 in one direction is disposed outside the second rotation shaft 461.

The second rotation shaft 461 is driven by a diving portion that is not shown. Thus, as the second rotation shaft 461 rotates, the rotation plate 462 contacts an outside boundary of the support portion 420, and, thus, the supplemental brake function may be realized.

As described above, according to an apparatus for transferring an optical element according to the embodiments of the invention, a brake contacts a support portion that supports the optical element, so that a brake function is realized, and, thus, a damage that may occur in a guide portion is minimized, thereby maintaining precision of the guide portion. Further, friction between the brake and the support portion can be used to stably maintain a stop position of the optical element. In addition, an elastic portion enables the brake function to be performed although an electrical driving force is not separately supplied, thereby minimizing power consumed to maintain the position of the optical element to a specific position.

The embodiments described herein may comprise a memory for storing program data, a processor for executing the program data, a permanent storage such as a disk drive, a communications port for handling communications with external devices, and user interface devices, including a display, keys, etc. When software modules are involved, these software modules may be stored as program instructions or computer-readable codes, which are executable by the processor, on a non-transitory or tangible computer-readable media such as read-only memory (ROM), random-access memory (RAM), a compact disc (CD), a digital versatile disc (DVD), magnetic tapes, floppy disks, optical data storage devices, an electronic storage media (e.g., an integrated circuit (IC), an electronically erasable programmable read-only memory (EEPROM), and/or a flash memory), a quantum storage device, a cache, and/or any other storage media in which information may be stored for any duration (e.g., for extended time periods, permanently, brief instances, for temporarily buffering, and/or for caching of the information).

The computer-readable recording medium can also be distributed over network-coupled computer systems (e.g., a network-attached storage device, a server-based storage device, and/or a shared network storage device) so that the computer-readable code may be stored and executed in a distributed fashion. This media can be read by the computer, stored in the memory, and executed by the processor. As used herein, a computer-readable storage medium excludes any computer-readable media on which signals may be propagated. However, a computer-readable storage medium may include internal signal traces and/or internal signal paths carrying electrical signals therein All references, including publications, patent applications, and patents, cited herein are hereby incorporated by reference to the same extent as if each reference were individually and specifically indicated to be incorporated by reference and were set forth in its entirety herein.

For the purposes of promoting an understanding of the principles of the invention, reference has been made to the embodiments illustrated in the drawings, and specific language has been used to describe these embodiments. However, no limitation of the scope of the invention is intended by this specific language, and the invention should be construed to encompass all embodiments that would normally occur to one of ordinary skill in the art.

The invention may be described in terms of functional block components and various processing steps. Such functional blocks may be realized by any number of hardware and/or software components configured to perform the specified functions. For example, the invention may employ various integrated circuit components, e.g., memory elements, processing elements, logic elements, look-up tables, and the like, which may carry out a variety of functions under the control of one or more microprocessors or other control devices. Similarly, where the elements of the invention are implemented using software programming or software elements the invention may be implemented with any programming or scripting language such as C, C++, Java, assembler, or the like, with the various algorithms being implemented with any combination of data structures, objects, processes, routines or other programming elements. Functional aspects may be implemented in algorithms that execute on one or more processors. Furthermore, the invention could employ any number of conventional techniques for electronics configuration, signal processing and/or control, data processing and the like. The words "mechanism" and "element" are used broadly and are not limited to mechanical or physical embodiments, but can include software routines in conjunction with processors, etc.

The particular implementations shown and described herein are illustrative examples of the invention and are not intended to otherwise limit the scope of the invention in any way. For the sake of brevity, conventional electronics, control systems, software development and other functional aspects of the systems (and components of the individual operating components of the systems) may not be described in detail. Furthermore, the connecting lines, or connectors shown in the various figures presented are intended to represent exemplary functional relationships and/or physical or logical couplings between the various elements. It should be noted that many alternative or additional functional relationships, physical connections or logical connections may be present in a practical device. Moreover, no item or component is essential to the practice of the invention unless the element is specifically described as "essential" or "critical".

The use of the terms "a" and "an" and "the" and similar referents in the context of describing the invention (especially in the context of the following claims) are to be construed to cover both the singular and the plural. Furthermore, recitation of ranges of values herein are merely intended to serve as a shorthand method of referring individually to each separate value falling within the range, unless otherwise indicated herein, and each separate value is incorporated into the specification as if it were individually recited herein. Finally, the steps of all methods described herein can be performed in any suitable order unless otherwise indicated herein or otherwise clearly contradicted by context. The use of any and all examples, or exemplary language (e.g., "such as" or "for example") provided herein, is intended merely to better illuminate the invention and does not pose a limitation on the scope of the invention unless otherwise claimed. Numerous modifications and adaptations will be readily apparent to those skilled in this art without departing from the spirit and scope of the invention.

What is claimed is:

1. An apparatus for transferring an optical element, the apparatus comprising:
   a support portion for supporting the optical element;
   a guide portion for guiding the support portion to move in a rectilinear direction;
   a brake disposed between a first position that contacts the support portion and restricts a movement of the support portion, and a second position that is spaced apart from the support portion and allows the movement of the support portion to change a position thereof; and
   a driving portion for driving the brake;
   wherein the brake is disposed outside the support portion, the first position is a position where the brake contacts at least a part of an outside boundary of the support portion, the second position is a position where the brake is outwardly spaced apart from the support portion and the brake is rotatably disposed to perform rotation between the first position and the second position;
   wherein the brake comprises a rotation plate disposed rotatably with respect to the support portion, and a movement shaft connected to the rotation plate and extending approximately parallel to a direction in which the guide portion extends.

2. The apparatus of claim 1, wherein the brake comprises a rotation shaft extending approximately parallel to the direction in which the guide portion extends and disposed to rotate in response to the driving portion, and a contact pad portion disposed outside the rotation shaft,
   wherein the support portion comprises a path portion through which the rotation shaft and the contact pad portion pass, and
   wherein the first position is a position where the rotation shaft rotates in one direction such that the contact pad portion contacts the path portion, and the second position is a position where the rotation shaft rotates in another direction such that the contact pad portion is spaced apart from the path portion.

3. The apparatus of claim 2, wherein the contact pad portion has a polygonal or oval cross-section such that the contact pad portion has at least one corner portion contacting the path portion as the rotation shaft rotates.

4. The apparatus of claim 3, wherein the path portion has a polygonal or oval cross-section such that the path portion surrounds the contact pad portion.

5. The apparatus of claim 2, further comprising a friction pad portion disposed on a surface of the path portion facing the contact pad portion.

6. The apparatus of claim 2, further comprising an elastic portion connected to the rotation shaft and rotating the rotation shaft toward any one of the first position and the second position.

7. The apparatus of claim 1, further comprising an elastic portion connected to the brake and applying pressure to the brake toward any one of the first position and the second position.

* * * * *